(No Model.)

J. A. O'NEIL.
BRUSH.

No. 435,766.  Patented Sept. 2, 1890.

Witnesses.
John Edwards Jr.
J. T. Case

Inventor.
John A. O'Neil.
By James Shepard
Atty.

UNITED STATES PATENT OFFICE.

JOHN A. O'NEIL, OF NEW BRITAIN, CONNECTICUT.

BRUSH.

SPECIFICATION forming part of Letters Patent No. 435,766, dated September 2, 1890.

Application filed February 19, 1890. Serial No. 341,083. (No model.)

*To all whom it may concern:*

Be it known that I, JOHN A. O'NEIL, a citizen of the United States, residing at New Britain, in the county of Hartford and State of Connecticut, have invented certain new and useful Improvements in Brushes, of which the following is a specification.

My invention relates to improvements in brushes of the class known as "filled" brushes; and the objects of my improvement are simplicity and economy in construction and utility and durability in the finished article.

Figure 1:
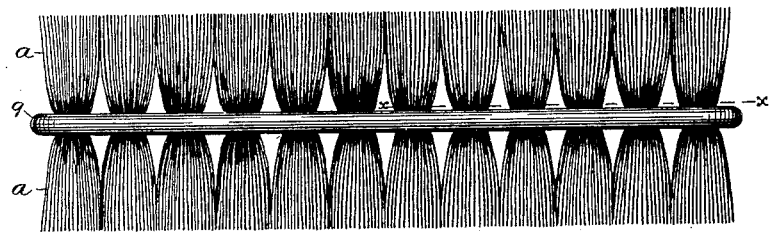
Figure 2:
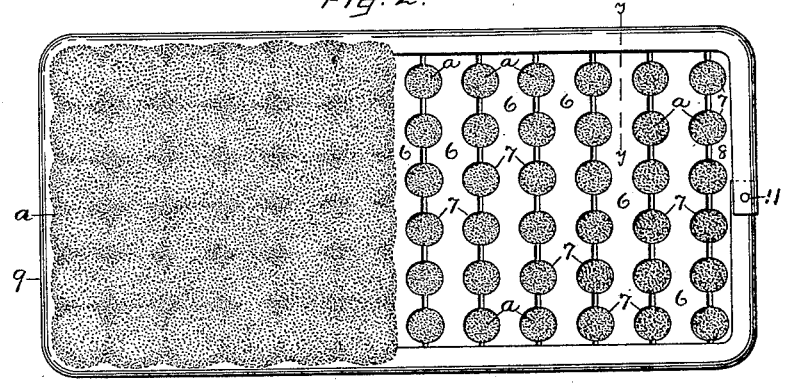
Figure 3:
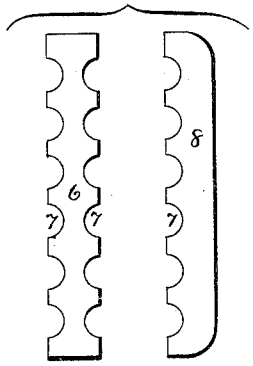
Figure 4:
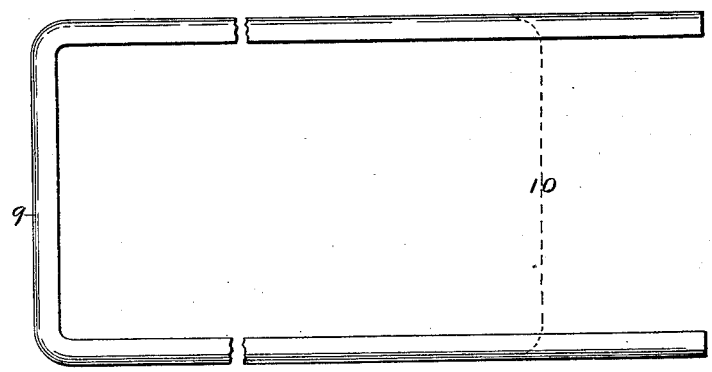
Figure 5:
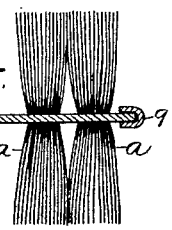

In the accompanying drawings, Figure 1 is a side elevation of my brush. Fig. 2 is a plan view of the same with a portion of the filling in section on the line $x\,x$ of Fig. 1. Fig. 3 is a plan view of the plate-sections. Fig. 4 is a plan view of the frame, and Fig. 5 is a section of a portion of said brush on the line $y\,y$ of Fig. 2.

I form the plate or board for the filling in separate plate-sections 6, provided with a series of notches or depressions 7 on each side, and end sections 8, with like depressions on one side only. These plate-sections are preferably of a length substantially equal to the width of the brush and of a width a little less than the desired distance from the center of one row of filling to that of the next, all as shown. I secure said sections in place by means of a grooved frame or rim 9, preferably made U-shaped in cross-section and of sheet metal, as shown in Fig. 5, and I first form said frame by bending the proper form for one end, as shown at the left-hand side of Fig. 4, leaving the opposite end open, as shown at the right-hand end of said figure. The filling $a$, of bristles or other desired material, is arranged in little sheaves or bunches of the desired length and placed in the orifices formed by the notches or depressions between the confronting edges of the plate-sections and end sections, with the outer edges of said sections resting in the groove of the U-shaped frame 9 until the desired length of brush is built up, the proper position for the edge of the last end section being indicated by the broken line 10 in Fig. 4. These plate-sections are firmly compressed together, so as to securely bind the filling in place. The opposite end of the frame is bent around into the form shown in Figs. 1 and 2 and the ends secured in any proper manner—as, for instance, by means of a rivet 11, as shown in Fig. 2. The brush thus formed is a double brush, is firmly secured together, and, being of metal or other material impervious to moisture, may be used without injury for a scrubbing-brush or other uses with water.

While I prefer to form a double brush for most uses, it is of course evident that the same construction permits of the filling being put in either doubled upon itself or not, so as to project mainly from one side for forming a single brush, and, if desired, the back side protected by any suitable covering.

I claim as my invention—

1. The herein-described brush, consisting of a grooved frame, plate-sections, and filling, substantially as described, and for the purpose specified.

2. The herein-described brush, consisting of a grooved frame, plate-sections notched or recessed upon opposite sides, with their outer edges resting in the groove of said frame, and the filling held in said notches, with the filling and plate-sections bound together by the frame, substantially as described, and for the purpose specified.

JOHN A. O'NEIL.

Witnesses:
JAMES SHEPARD,
JOHN EDWARDS, Jr.